United States Patent
Rost

[11] 3,825,119
[45] July 23, 1974

[54] WASTE WATER TREATMENT UNIT
[76] Inventor: Kai Lennart Rost, The Ledge, Hallowell, Maine 04347
[22] Filed: Mar. 8, 1973
[21] Appl. No.: 339,184

[52] U.S. Cl............ 210/97, 137/599, 210/139, 210/150, 210/196, 210/209, 210/308, 210/317, 210/433, 210/436, 210/456, 261/27, 261/98, 261/124
[51] Int. Cl............ B01d 21/24, B01d 35/00
[58] Field of Search ........... 210/150, 151, 220, 287, 210/195, 197, 299, 416, 484, 485; 261/27, 29, 94, 95, 98, 124; 239/419.5, 425.5, 566, 568; 222/193, 194; 417/77, 83, 90; 137/339, 563, 599

[56] References Cited
UNITED STATES PATENTS
| | | | |
|---|---|---|---|
| 118,472 | 8/1871 | Munzinger | 417/77 |
| 660,498 | 10/1900 | Fleming | 210/299 X |
| 2,135,969 | 11/1938 | Donaldson | 137/599 |
| 2,865,511 | 12/1958 | Hopkins | 210/416 |
| 3,434,522 | 3/1969 | Laurenty | 239/566 X |
| 3,543,937 | 8/1968 | Choun | 210/150 |

FOREIGN PATENTS OR APPLICATIONS
| | | | |
|---|---|---|---|
| 953 | 1855 | Great Britain | 210/299 |

Primary Examiner—Roy Lake
Assistant Examiner—Craig R. Feinberg

[57] ABSTRACT

A waste water treatment unit, particularly adapted to meet household requirements, has a tank receiving the waste water and a chamber above the tank. A filter within the chamber consists of a downwardly and inwardly tapering fabric bag containing a trickling filter body and has its bottom end open and in communication with the tank. A pump in the tank, operable between maximum and minimum levels, delivers the waste water through a conduit provided with a distributor or diffuser above the filter body and a return pipe in communication with the tank and provided with an aspirator by which returned waste water draws air into the tank. The return pipe adjacent the distributor is of a smaller diameter than the distributor with the result that pressure builds up in the distributor forcing some of the circulating water through lengthwise slits and into the filter with solids continuing with the rest of the water into and through the return pipe. Water passing downwardly through the trickling filter body to the bottom of the bag returns to the tank while that filtered by the bag is discharged from the unit. Time controlled means are also shown for use in aerating the tank contents by circulating them through the chamber and into the return pipe by by-passing the distributor.

19 Claims, 4 Drawing Figures

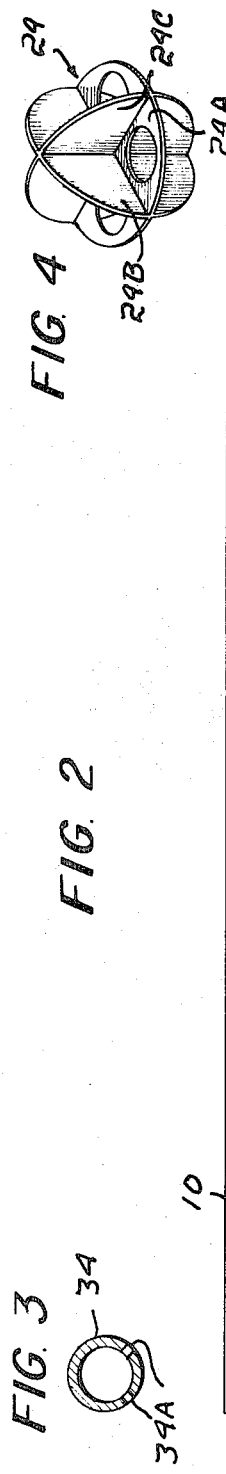

3,825,119

WASTE WATER TREATMENT UNIT

BACKGROUND OF THE INVENTION

It has become well established that conventional septic tanks often fail to properly effect the disposal of household waste water. This is particularly true in the case of shore properties which are commonly spaced so close to a river, pond, lake, or ocean that the discharge from the septic tank often results in pollution. The intended function of a septic tank is that of only so processing waste waters that they may be discharged into and be absorbed by the soil. As a consequence, they and their distribution beds must be located a substantial distance from such bodies of water and their tributaries, such distance being dependent on several factors with an important one of which being the ability of the surrounding ground to absorb the discharged waters.

THE PRESENT INVENTION

The principal objective of the present invention is to provide a unit that is effective in so processing waste waters that the only objectionable feature of the waters discharged therefrom is their nutrient content making it necessary to provide for their discharge into and absorption by the ground only where, if they entered fresh water, objectionable vegetation growths would or might result.

In accordance with the invention, this objective is attained with a unit having a tank provided with a waste water inlet and a chamber above the tank in which there is a filter consisting of a body of filtering material within a container of a water permeable material and downwardly and inwardly inclined with its lower end open and in communication with the interior of the tank. The unit is provided with means operable, when the tank contents are between predetermined levels, to circulate tank contents through the chamber and back into the tank and the conduit includes a distributor in the chamber provided with outlets disposed so that some of the circulating liquid is discharged into the filter. The unit also includes means operable to deliver air into the tank. The unit has means to receive water filtering through the wall of the container and to discharge that filtrate from the unit. Such a unit provides extensive aeration of the tank contents and its filter has a capacity to accommodate shock loads.

Another objective of the invention is to utilize filtering bodies of a trickling type and that term, as used herein designates a filtering body consisting of a large number of elements that do not become compacted and that provide a multiplicity of interconnected passages of relatively large size and providing extensive surfaces areas on which biological slimes develop in use so that any organic matter carried by the liquid passing downwardly through the filtering body must follow tortuous courses along which it is exposed to the attack of microorganisms contained in the biological slime. Such a trickling filter ensures a capacity such that shock loads may be accommodated but make necessary the exclusion from the liquid delivered thereto any organic particules that would or might plug its passages. Such a filter is aerated when tank contents are not being circulated.

Another objective of the invention is to minimize the introduction of solids into the filter by providing the distributor with slits permitting the discharge of water but ensuring that all except small particles of organic matter than can be safely received by the filter will continue their lengthwise travel into the return portion of the circulating means.

Another objective of the invention is to increase the efficiency of the distributor, an objective attained by providing the return portion of the conduit with a section of reduced diameter thereby so increasing the pressure within the distributor that the liquid is forced through the slits as a spray.

Yet another objective of the invention is to provide that the return portion of its circulating means include an aspirator operable to draw into the tank with the returned liquid.

Another objective of the invention is to provide means to aerate the filter preferably by providing that air delivered into the tank may flow upwardly into the chamber below the filter.

Yet another of the objectives is to provide time controlled means to aerate the tank contents at such times as little or no waste water will be entering the tank. To accomplish that result, means are provided to circulate the tank contents without filtering them but desirably using the circulating tank contents to deliver air into the tank preferably using the return pipe as an aspirator.

BRIEF DESCRIPTION OF THE DRAWINGS

A preferred embodiment of the invention is illustrated by the accompanying drawings of which:

FIG. 2 is a section taken approximately along the indicated line 2—2 of FIG. 1;

FIG. 3 is a section taken approximately along the indicated line 3—3 of FIG. 2; and FIG. 4 is a view in perspective of one of the plastic elements of the filter.

THE PREFERRED EMBODIMENT OF THE INVENTION

Figure 1:
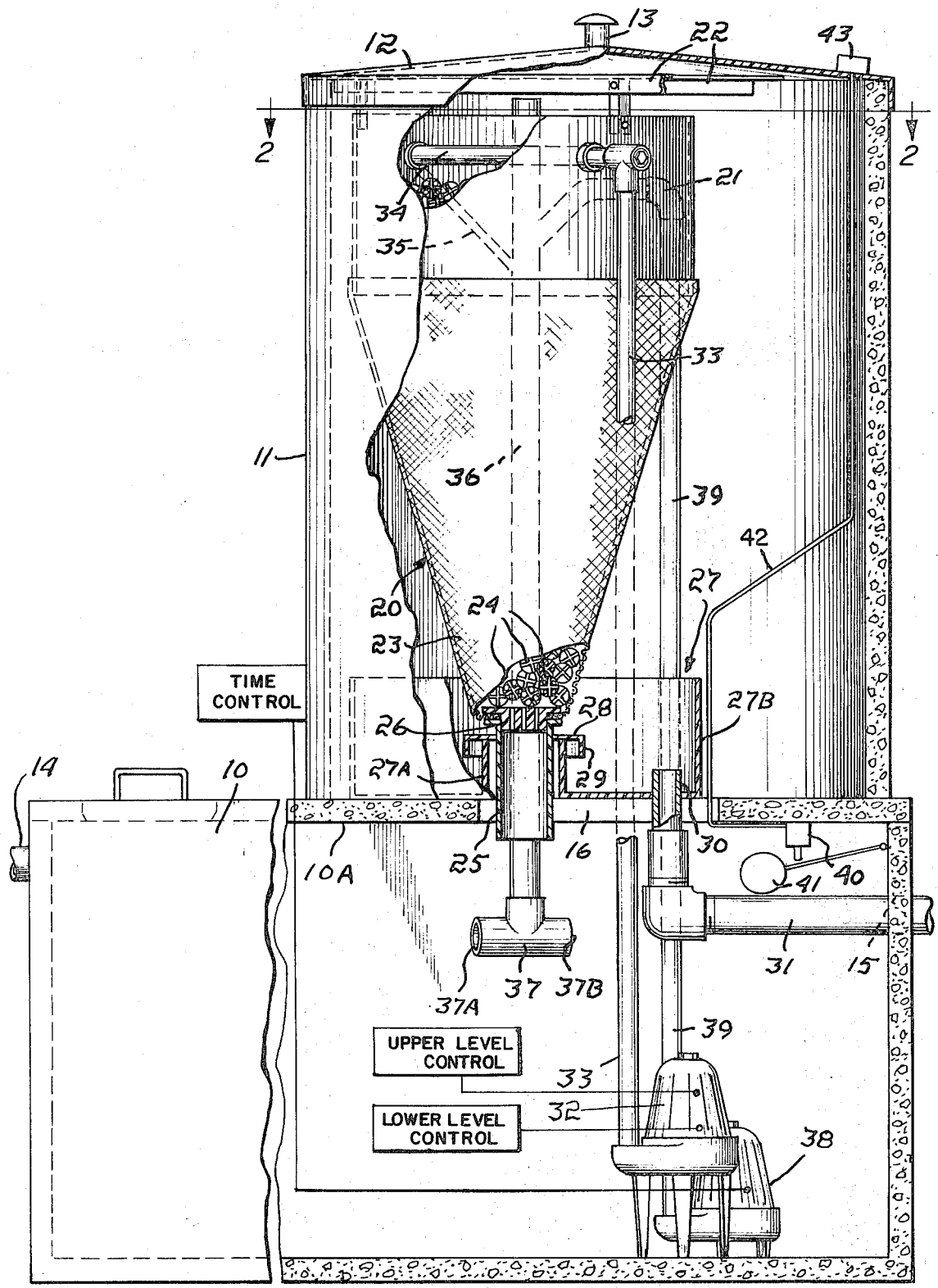
FIG. 1 is a partly sectioned side elevation of a waste water unit in accordance with the invention.

The preferred embodiment of the invention is illustrated with particular reference to a waste water treatment unit to meet the requirements of the average household and includes a tank 10 and a chamber 11, conveniently a section of concrete pipe closed by a removable cover 12 having an air inlet 13. The chamber 11 rests on the upper wall 10A of the tank 10 which may be and conveniently is a conventional septic tank having a waste water inlet 14 at one end and a discharge port 15 in its other end. Domestic septic tanks are usually of 500 or 750 gallon capacities.

The tank wall 10A has a slot 16 extending radially with respect to the center of the chamber 11 and rectangular ports 17 and 18 and a circular port 19 are located inside the chamber 11.

A filter unit, generally indicated at 20, includes a cylindrical holder 21, desirably of fibreglass, suspended by supports 22 whose ends rest on the upper end of the chamber 11. The filter unit 20 has an inwardly and downwardly tapering cloth filter bag 23, typically of a closely woven nylon cloth, containing the body of a trickling filter which consists of a body of elements 24. The lower end of the bag 23 is open and receives within it and is secured to the upper end of a discharge pipe 25 extending downwardly through the slot 16 and provided with a ported disc 26 preventing the escape of the trickle filter elements 24.

As earlier stated, a trickling filter consists of a contained body of non-compacting elements 24 that provide a multiplicity of interconnected tortuous passages of relatively large size with extensive surface areas on which biological slimes develop so that any organic matter that passes downwardly through the passages is exposed to the oxidizing attack of micro-organisms. As examples of elements that are satisfactory for the trickling filter, reference is made to FIG. 4 in which an element 24 is shown of the type manufactured by Plastic Industries Company of 22167 Camelot Court, Birmingham, Michigan, 48010, and identified as its "Protak" P-251. Such an element 24 is formed from polypropylene and consists of three integrally joined circular plane members 24A, 24B, and 24C having a common center with each member disposed at right angles relative to the other two and with one of them, the member 24A having holes in each of its sectors.

The lower end of the filter bag 23 is surrounded by a collector generally indicated at 27 resting on the tank wall 10A and including circular inner and outer walls 27A and 27B, respectively. The walls 27A loosely surround the pipe 25 which has a disc 28 provided with a skirt 29 dimensioned to freely receive the wall 27A within it with the disc 26 seated on its upper end. The wall 27B is dimensioned to extend a slight distance outwardly with respect to the holder but with the ports 17, 18, and 19 uncovered. The collector 27 has an outflow pipe 30 extending downwardly through the slot 16 and into a discharge or drain pipe 31 extending through the port 15.

An electrically operated submersible pump 32 is located within the tank 10 and is of the type having a control bringing it into service whenever the liquid in the tank 10 reaches a predetermined upper level and operable to stop its operation when a predetermined low level is reached. As such pumps are conventional, neither its controls or circuits are shown. The pump outlet is connected to a conduit 33 extending upwardly through the port 17 and into the chamber 11 with the port 17 so dimensioned that the pump 32 may be withdrawn therethrough in the event it needs servicing. The conduit 33 includes a distributor 34 preferably of polyvinyl chloride, held in a horizontal position by the support 21 and provided with lengthwise discharge slits or slots 34A desirably about one-eighth of an inch or less in width and disposed to discharge liquid downwardly into the filter. The other end of the distributor 34 is connected to a return pipe 35 of somewhat smaller diameter, 1 ½ inches, for example. The return pipe 35 opens into a larger return pipe 36 in an aspirator establishing relationship below its open upper end. The pipe 36 extends downwardly into the tank 10 freely through the hole 19 and terminates in a T 37 providing laterally disposed outlets 37A and 37B spaced above the normal upper limit of the liquid in the tank 10. With this construction, the returning liquid draws air with it through the pipe 36 and into the tank.

The operation of the circulating means is intermittent as it depends on the liquid level in the tank 10 and as little or no waste water enters the tank during a substantial part of each night, it is preferred that the unit be provided with time-controlled means to aerate the tank contents. To that end, an electrically operated, submersible pump 38 is mounted in the tank 10 and has its outlet connected to a pipe 39 extending upwardly into the chamber 11 through the port 18 by-passing the filter 20 and so joined to the pipe 36 above the pipe 35 as to function as an aspirator to draw air from the chamber 11 into the tank 10. The port 18 is dimensioned to permit the pump 38 to pass through it. It will be noted that the pump 38 is positioned below the pump 32 so that there are always tank contents for it to circulate and the pipe 36 is dimensioned to accommodate the output of both pumps if, during the night, an unusual volume of waste water entered the tank 10 to bring the pump 32 into service. As the pump 38 and time controls are conventional, its circuits and the time controls are not shown.

Desirably and as shown, the tank 10 contains a normally open switch 40 adapted to be closed by the float 41 should the liquid in the tank 10 rise to an unwanted level, the switch 40 then completing the circuit 42 to the alarm 43.

In operation, raw waste enters into the tank 10 through the inlet 14 and when the liquid reaches a predetermined level therein, the pump 32 is brought into service to circulate waste water through the distributor 34 and back to the tank 10 with such circulation continuing until a predetermined lower liquid level is reached. Some of the circulating liquid is discharged through the distributor slots 34A but most of the flow continues through the return pipes 35 and 36 and is operable to draw air with it as it flows. The return pipe 35, while of a diameter somewhat less than that of the distributor 34, is sufficiently large to handle raw waste water but because of the differences in their diameters, it functions to cause a pressure increase in the distributor 34 with the result that liquid is forced downwardly through the slits 34A. The fact that the slits are narrow and extend lengthwise of the distributor 34, i.e., in the direction of travel of the circulating waste water, solids do not accumulate in the distributor due to their velocity thus preventing the slits 34A from becoming clogged.

The sprayed liquid trickles downwardly through and about the plastic filter media 24 with that which reaches the bottom returning to the tank 10 through the pipe 25. Some of the liquid sprayed into the filter, because of the shape of the bag 23, soaks through it and is thus strained with the filtrate either dropping directly into the collector 27 or flowing down its outer surface to drop therein at a lower point.

It will be appreciated that, as in the case of any aerobic treatment system, the contents thereof soon develop growths of aerobic organisms that oxidize organic materials in the waste water. Aerobic conditions are established in the tank 10 through oxygen drawn into it by that part of the circulated waste water that is returned as well as that entering the tank 10 through the pipe 25 and also by oxygen taken up by the filter 25. As a consequence, both the bag itself 23 and the elements 24 of the trickling filter contained therein become coated with a biological slime containing micro-organisms that feed on organic matter. During periods when the pump 32 is not operating, air circulates by natural drafts through the filter supplying oxygen to the bacterial growth and when an aerating device such as the pump 38 is also used aeration effects are accelerated.

Thus not only is discharged waste water subjected to an efficient filtering system but also organic matter is consumed by the aerobic organisms for which the filter affords optimum conditions for their culture with the tank contents subject to extensive aeration.

By the use of filter 20 comprising a bag 23 and a trickling filter contained thereby, shock loads delivered to it may be readily accommodated. The bags 23 being made of a closely woven fabric, are excellent filters and the filters 20 are efficiently aerated by natural drafts. Another advantage of the filter 20 is that the shape of the bag 23 increases somewhat the velocity of liquids as they reach the bottom thereof and carry any biological growth into the tank 10 that may have so built up as to be sloughed off, such sloughed-off growths continuing the assimilation process in the tank 10.

I claim:

1. A waste water treatment unit comprising a tank having a waste water inlet, a chamber above said tank, a filter in said chamber including a water permeable, downwardly and inwardly inclined container having an open lower end in communication with the interior of said tank and a trickling filter body within said container including a plurality of non-compacting members circulating means including a conduit extending from said tank into said chamber and back into said tank and a pump in said tank in control of said conduit, said conduit including a distributor extending above said body and having outlets disposed to discharge liquid into said filter, means to deliver air into said tank, said pump of a type operative whenever the liquid in the tank rises to a predetermined level and inoperative when it falls to a predetermined lower level, and a discharge operable to receive filtrate passing through the wall of the container.

2. The waste water treatment plant of claim 1 and means operable to aerate the filter.

3. The waste water treatment plant of claim 1 and at least one connection placing the chamber in communication with the tank enabling air delivered into the tank to flow upwardly into the chamber.

4. The waste water treatment plant of claim 3 in which the air delivery means is operable whenever the tank contents are being circulated.

5. The waste water treatment plant of claim 3 in which the air delivery means is time controlled.

6. The waste water treatment tank of claim 1 and an air inlet in the chamber and the air inlet and the return portion of the conduit are joined in an aspirator-creating relationship in which the returning liquid draws air through the inlet and into the tank.

7. The waste water treatment plant of claim 6 in which the discharge end of the return portion of the conduit is above the normal upper level of the liquid in the tank.

8. The waste water treatment tank of claim 5 in which the air delivery means includes means operable to circulate the tank contents, an air inlet in the chamber extends into the tank and the circulating means is connected to the air inlet to use said inlet as a return and to draw air with it into the tank.

9. The waste water treatment tank of claim 6 and a second conduit extending from the interior of the tank and into the chamber, a second pump in said tank has its outlet in communication with the second conduit, the second pump is joined to the water inlet in an aspirator-creating relationship by which tank contents circulated by the second pump draw air through the inlet, the second pump has its intake below that of the first named pump and includes a time control.

10. The waste water treatment plant of claim 1 in which the distributor has at least one lengthwise slot that is sufficiently narrow to exclude solids that would tend to clog the trickling filter body.

11. The waste water treatment plant of claim 10 in which the return portion of the conduit includes a constriction adjacent the distributor operable to increase the pressure in the distributor.

12. The waste water treatment plant of claim 1 in which the container for the trickling filter body includes a porous bag and a tubular drain to which its lower end is sealed and which extends into the tank and which includes a screen preventing the escape of the members of the trickling filter body.

13. The waste water treatment plant of claim 12 in which the bag is formed of nylon cloth.

14. The waste water treatment plant of claim 12 in which the filter includes a support detachably mounted in the chamber, and the bag is detachably attached to the support.

15. The waste water treatment plant of claim 14 in which the distributor is also held by the support.

16. The waste water treatment plant of claim 1 in which the discharge includes a collector underlying the interior downwardly and inwardly inclined portions of the container.

17. The waste water treatment plant of claim 1 in which the upper wall of the tank has a port, the lower end of the container is a tubular drain extending into said port and the discharge includes a collector having an inner wall defining a port through which said drain extends and an outer wall disposed and dimensioned to receive liquid filtering through any portion of the container.

18. The waste water treatment plant of claim 17 in which the tank port and the collector port are dimensioned to freely receive the drain and the drain includes a flange dimensioned to rest on the inner wall of the collector and provided with a skirt freely receiving said inner wall.

19. The waste water treatment tank of claim 1 in which the tank has a flat top wall and the chamber rests thereon and the top wall has at least one passageway in communication with the interior of the chamber enabling air in the tank to rise into it.

* * * * *